(12) United States Patent
Feliciano

(10) Patent No.: US 7,281,335 B2
(45) Date of Patent: Oct. 16, 2007

(54) CARPENTER'S LEVEL

(76) Inventor: Pedro Feliciano, 109 Harbor Rd., Staten Island, NY (US) 10303

(*) Notice: Subject to any disclaimer, the term of this patent is extended or adjusted under 35 U.S.C. 154(b) by 0 days.

(21) Appl. No.: 11/283,298

(22) Filed: Nov. 18, 2005

(65) Prior Publication Data

US 2007/0113413 A1    May 24, 2007

(51) Int. Cl.
*G01C 9/00* (2006.01)
*G01C 9/18* (2006.01)

(52) U.S. Cl. .............................. 33/374; 33/376; 33/451

(58) Field of Classification Search ................. 33/365, 33/374, 370, 375, 376, 377, 379, 381, 341, 33/349, 350, 351, 353, 354, 451
See application file for complete search history.

(56) References Cited

U.S. PATENT DOCUMENTS

| 1,126,548 | A |   | 1/1915  | Mayes ........................ 33/388 |
| 1,132,318 | A |   | 3/1915  | Feder ......................... 403/341 |
| 1,605,604 | A |   | 11/1926 | Nerson ........................ 33/347 |
| 1,655,766 | A | * | 1/1928  | Hildebrant .................. 403/340 |
| 2,332,347 | A | * | 10/1943 | Schaefer et al. .............. 33/461 |
| 2,383,166 | A |   | 8/1945  | Seiwell ....................... 403/326 |
| 2,419,451 | A | * | 4/1947  | Keller .......................... 33/374 |
| 2,535,791 | A | * | 12/1950 | Fluke .......................... 33/347 |
| 2,637,912 | A | * | 5/1953  | Baldwin ...................... 33/369 |
| 3,180,035 | A | * | 4/1965  | Olexson et al. .............. 33/347 |
| 3,225,451 | A |   | 12/1965 | Olexson et al. .............. 33/347 |
| 4,073,062 | A |   | 2/1978  | Wright ........................ 33/388 |
| 4,130,943 | A |   | 12/1978 | Talbot ......................... 33/374 |
| 4,317,289 | A |   | 3/1982  | Conn .......................... 33/498 |
| 4,503,623 | A |   | 3/1985  | Gould ......................... 33/379 |
| 4,590,682 | A |   | 5/1986  | Koch .......................... 33/383 |
| 4,928,395 | A | * | 5/1990  | Good .......................... 33/374 |
| 4,999,921 | A |   | 3/1991  | Bird et al. ................... 33/388 |
| D319,029 | S |   | 8/1991  | Burt ........................... D10/69 |
| 5,075,978 | A |   | 12/1991 | Crowe ...................... 33/348.2 |
| 5,157,842 | A |   | 10/1992 | Swanda ....................... 33/365 |
| 5,412,875 | A |   | 5/1995  | Hilderbrandt ............... 33/374 |
| 5,433,011 | A |   | 7/1995  | Scarborough et al. ....... 33/376 |
| 5,577,327 | A |   | 11/1996 | Archambault ............... 33/374 |
| 5,839,201 | A | * | 11/1998 | Young ......................... 33/451 |
| 6,058,617 | A | * | 5/2000  | Nadu ...................... 33/366.12 |
| 6,293,023 | B1 | * | 9/2001 | Schooley ..................... 33/374 |
| 6,543,148 | B2 |   | 4/2003 | Tufariello ................... 33/371 |
| 6,640,456 | B2 | * | 11/2003 | Owoc et al. ................. 33/382 |
| 6,836,973 | B1 | * | 1/2005 | Eccles, Jr. ................... 33/374 |
| 2002/0121025 | A1 |   | 9/2002 | Leite ........................... 33/374 |
| 2003/0079357 | A1 |   | 5/2003 | Liao ............................ 33/374 |

* cited by examiner

*Primary Examiner*—Diego Gutierrez
*Assistant Examiner*—Amy R. Cohen
(74) *Attorney, Agent, or Firm*—Gerald E. Hespos; Anthony J. Casella

(57) ABSTRACT

A level assembly includes a main level with a base wall, end supports at opposite ends of the base wall and at least one intermediate support extending from the base wall at a location between the end supports. Bubble tubes may be mounted in the end supports and/or the intermediate support of the main level. At least first and second auxiliary levels are releasably mounted to the base wall of the main level and can be used independently of the main level. Alternatively, the main level can be used with the auxiliary levels in place and in certain embodiment can be used while the auxiliary levels are separated from the main level.

18 Claims, 4 Drawing Sheets

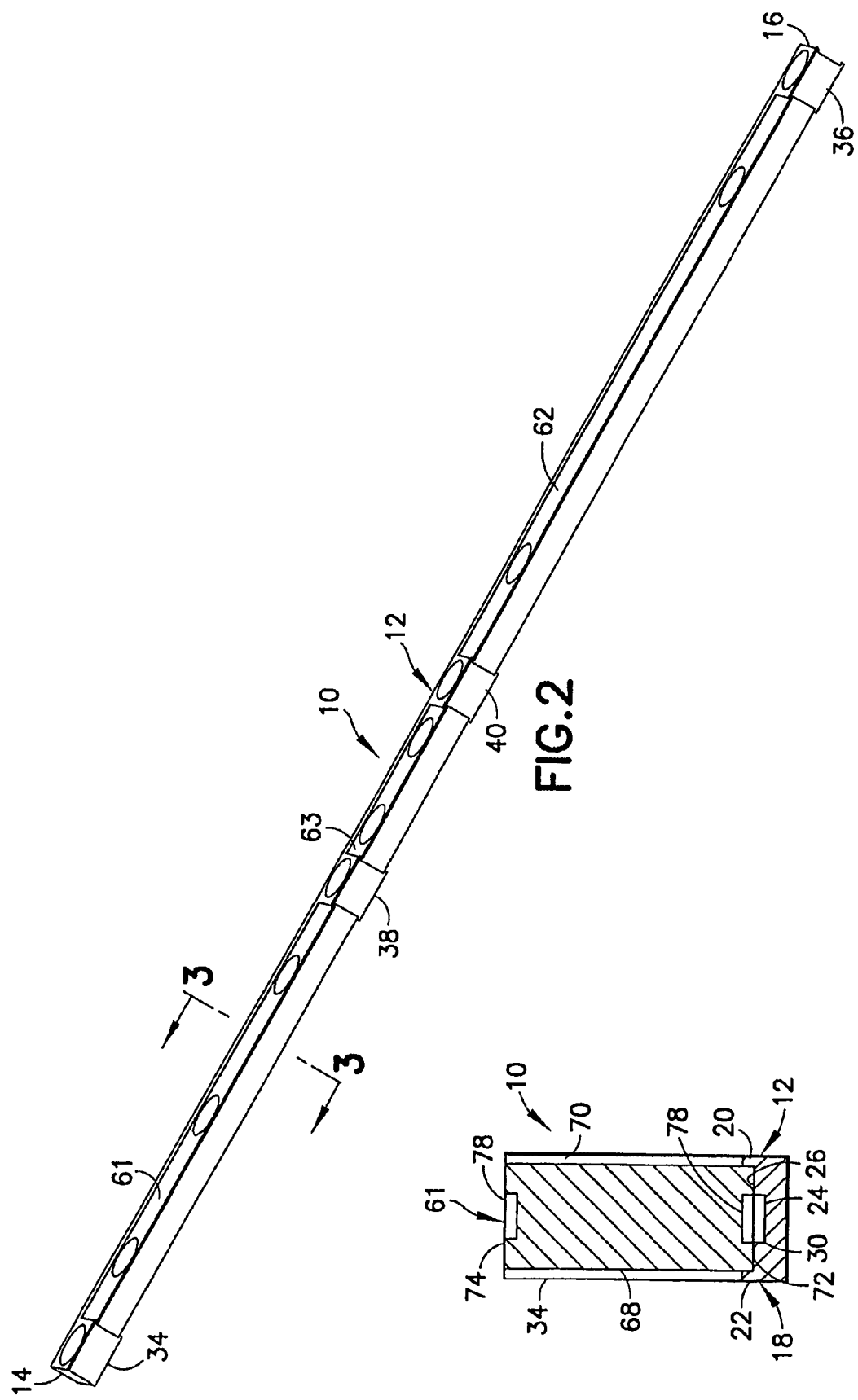

CARPENTER'S LEVEL

BACKGROUND OF THE INVENTION

1. Field of the Invention

The invention relates to a bubble level assembly, such as the type used by a carpenter.

2. Description of the Related Art

A typical carpenter's level is an elongate generally rectangular structure having opposite first and second ends. Planar top and bottom faces are aligned parallel to one another and extend between the ends. The top and bottom faces are the portions of the prior art level that are placed against another surface for assessing horizontal or vertical alignment of the surface. The prior art level also has a front face and a rear face that connect the top and bottom faces and the respective ends. The front and rear faces on most prior art levels are parallel to one another. However, the prior art also includes torpedo levels that have the front and rear faces tapering towards one another in proximity to the respective ends of the level. Many other prior art levels have recessed front and rear faces so that the level has a cross section that resembles an I-beam.

A typical prior art level includes a plurality of glass tubes that are filled partly with a liquid spirit. The portion of the tube that is not filled by the liquid forms a bubble. Movement of the level will cause the liquid to shift gravitationally within the tube, and hence will cause a repositioning of the bubble. The tube includes a pair of lines that are spaced apart by a distance approximately equal to the length of the bubble. The liquid will be disposed symmetrically relative to the lines on the tube when the tube is aligned horizontally. As a result, the bubble will be positioned precisely between the lines. The typical prior art level includes at least a first tube aligned parallel to the top and bottom faces of the level and at least a second tube aligned perpendicular to the top and bottom faces of the level. Some prior art levels are configured to permit one or more of the bubble tubes to be rotated in the level between a position where the tube is parallel to the top and bottom faces, a position where the tube is perpendicular to the top and bottom faces and possibly one or more intermediate positions.

A good quality short level often is adequate for assessing the horizontal or vertical alignment of a generally planar surface. A short level also can be easier to manipulate than longer levels. However, levels can be used to assess the alignment of the high points on an uneven surface. A short level may not have sufficient length to rest properly on two spaced-apart high points on an even surface. Levels also are used frequently to compare the alignment of two spaced apart objects, such as beams in a building. For example, a carpenter may want to install gypsum board across studs of a wall or ceiling or a carpenter may want to secure plywood or particle board to floor beams. Beams are not always level with one another, even on new construction. Beams on older structures rarely are level. As a result, the carpenter may want to assess the levelness across several beams. The carpenter may then use lath or other thin strips of wood to shim up the lower beams. Alternatively, a carpenter may chose to add a nailing strip to the side of a lower beam to bring the lower beam up to level with the higher beams.

Line levels can be used to assess the degree of levelness across several beams. The line level typically is very small and has clips to permit mounting on a string. The combination of the line level and the string enable an assessment of levelness across a considerable distance. However, strings are affected by gravity and will sag due to the weight of the string and the weight of the level. As a result, line levels generally do no provide very high precision. Furthermore, the positioning of a line level is complex and time consuming.

Laser levels permit accurate assessment of levelness across a considerable distance. However, a good quality laser level is fairly expensive and can be complicated to set up, calibrate and use.

A good quality carpenter's level generally can be purchased for a reasonably cost and can be used quickly without a complicated set up or calibration. However, the many possible uses for a carpenter's level have required carpenters and many homeowners to maintain a collection of levels of different dimensions. Most carpenters will carry a short torpedo level that may be less than one foot long. The typical carpenter also will carry a level of 24 or 36 inches and a level of 48 inches. A 24 or 36 inch level typically is long enough to span two or three beams. The 48 inch level is long enough to span the width of a four foot by eight foot sheet gypsum board or plywood and the beams to which such a sheet will be secured. Carpenters also must carry many other tools. Hence, the need for several levels of different dimensions complicates the tool inventory management responsibilities of a carpenter. In particular, the carpenter must be certain that all required tools are carried to the job and are removed from the job. The need for three or more levels complicates this effort.

The prior art includes multi-component levels that can be assembled and disassembled to accommodate the needs of a particular job. The typical prior art multi-component level includes a plurality of level segments that can be attached in end-to-end relationship. Levels or this type are shown, for example, in U.S. Pat. Nos. 1,132,318, 1,605,604, 2,383,166, 5,433,011 and Published U.S. Pat. No. 2002/0121025. Good quality end-to-end connections can be costly to manufacture. Furthermore, the various segments of such a level are difficult to align properly in end-to-end relationship to effect the connection, and the various level segments can disconnect unintentionally if not connected properly. Furthermore, levels often are used in environments near dirt or other debris. Such debris can soil the ends of the level segments that must be connected, and hence can further complicate assembly and disassembly. The small interconnectable parts at the end of such a level are not easily cleaned.

The subject invention has been made in view of the above described problems. Accordingly, it is an object of the invention to provide a level assembly that can accommodate the various space requirements and limitations for the work environment in which the level is used.

It is a further object of the invention to provide a level that can be transported easily to and from a job.

Another object of the invention is to provide a level assembly that can be assembled and disassembled very easily.

It is another object of the subject invention is to provide a level assembly that can be cleaned and maintained easily.

SUMMARY OF THE INVENTION

The subject invention relates to a carpenter's level that has a main level and a plurality of auxiliary levels that are removably attached to the main level. The main level includes opposite first and second ends and a base wall that extends between the ends. Opposite first and second supports are secured to the base wall of the main level in proximity to the respective first and second ends. At least one intermediate support is secured to the base wall of the main level at least at one location between the first and second supports. The intermediate support preferably is not disposed symmetrically between the first and second end supports. In a preferred embodiment, the main level has a plurality of intermediate supports disposed between the first and second end supports. The spacings between first and second end supports and the first and second intermediate supports preferably are not equal. Additionally, the spacing between the first and second intermediate supports does not equal the spacing between the first end support and the first intermediate supports or the spacing between the second end support and the second intermediate support.

The supports preferably have bubble tubes therein. At least one of the bubble tubes may be oriented substantially parallel to the base wall of the main level and at least one of the bubble tubes may be oriented substantially normal to the base wall of the main level. Thus, the main level can be used to check the alignment of a substantially horizontal surface or to check the alignment of a substantially vertical surface.

The bubble tubes may be mounted to extend substantially diametrically across substantially cylindrical rings that are mounted rotatably in the respective supports. The rings and supports are constructed to enable the orientation of the bubble tubes to be shifted from an alignment substantially parallel to the base wall of the main level, an alignment substantially normal to the base wall of the main level and at least one alignment where the axis of the bubble tube defines an acute angle to the base wall of the main level.

The auxiliary levels of the level assembly are dimensioned and configured to be mounted releasably substantially on the base wall of the main level and at locations between the supports of the main level. Thus, the level assembly may include a first auxiliary level that can be mounted in the base wall of the main level substantially adjacent the first support and a second auxiliary level that can be mounted on the base wall of the main level substantially adjacent the second support. In a preferred embodiment, the level assembly further includes a third auxiliary level that can be mounted on the base wall of the main level between the first and second intermediate supports.

The first auxiliary level preferably defines a length to extend completely from the first end support to the nearer of the intermediate supports. Similarly, the second auxiliary level defines a length to extend substantially continuously from the second support to the nearer of the intermediate supports. The third auxiliary level, if provided, has a length to extend substantially continuously from the first intermediate support to the second intermediate support. The auxiliary levels may define cross sections substantially corresponding to the cross sections defined by the respective supports. However, in certain embodiments, the auxiliary levels may be cross-sectionally slightly smaller than the supports of the main level.

Each auxiliary level preferably has at least one bubble tube therein. At least one bubble tube preferably is aligned substantially parallel to the longitudinal direction of the respective auxiliary level. However, at least one bubble tube may extend substantially normal to the longitudinal direction of the respective auxiliary level. At least one of the bubble tubes in at least one of the auxiliary levels may define a diameter in a ring that is mounted rotatably in the respective auxiliary level. Thus, as described above, the bubble tube can be rotated into a plurality of different alignments relative to the axis of the corresponding auxiliary level.

The auxiliary levels preferably are held releasably on the main level by a releasable attachment means. For example, the releasable attachment means may comprise magnets mounted in the respective auxiliary levels and/or in the base of the main level. The magnets are disposed to hold the auxiliary levels in position adjacent the base wall of the main level and between the corresponding supports on the main level. However, the magnetic force is selected so that the auxiliary levels can be separated from the main level without using excessive force. Attachment means other than mating pairs of magnets can be provided. For example, magnets may be provided on only the main level or on the auxiliary levels and the opposed mating face can be formed at least partly from a ferrous metal.

The level assembly can be stored and transported with the auxiliary levels releasebly attached to the main level. This assembly of the auxiliary levels and the main level also may be used to assess alignment of a large surface or to assess the alignment between two surfaces that are spaced apart by a considerable distance. For example, a four foot long level assembly can be used to check levelness across four studs spaced at 16 inch centers so that opposite ends of the level assembly can be supported on parts of the outermost beams, while more central parts of the level assembly can be supported on the two intermediate beams. The main level is too long for many tasks. In these situations, the carpenter can separate an auxiliary level of appropriate length from the main level. The auxiliary level can be replaced on the main level after use.

BRIEF DESCRIPTION OF THE DRAWINGS

FIG. 2 is a perspective view of the level assembly in an assembled condition.

FIG. 3 is a cross-sectional view taken along line 3-3 in FIG. 2.

DETAILED DESCRIPTION OF THE PREFERRED EMBODIMENTS

Figure 1:
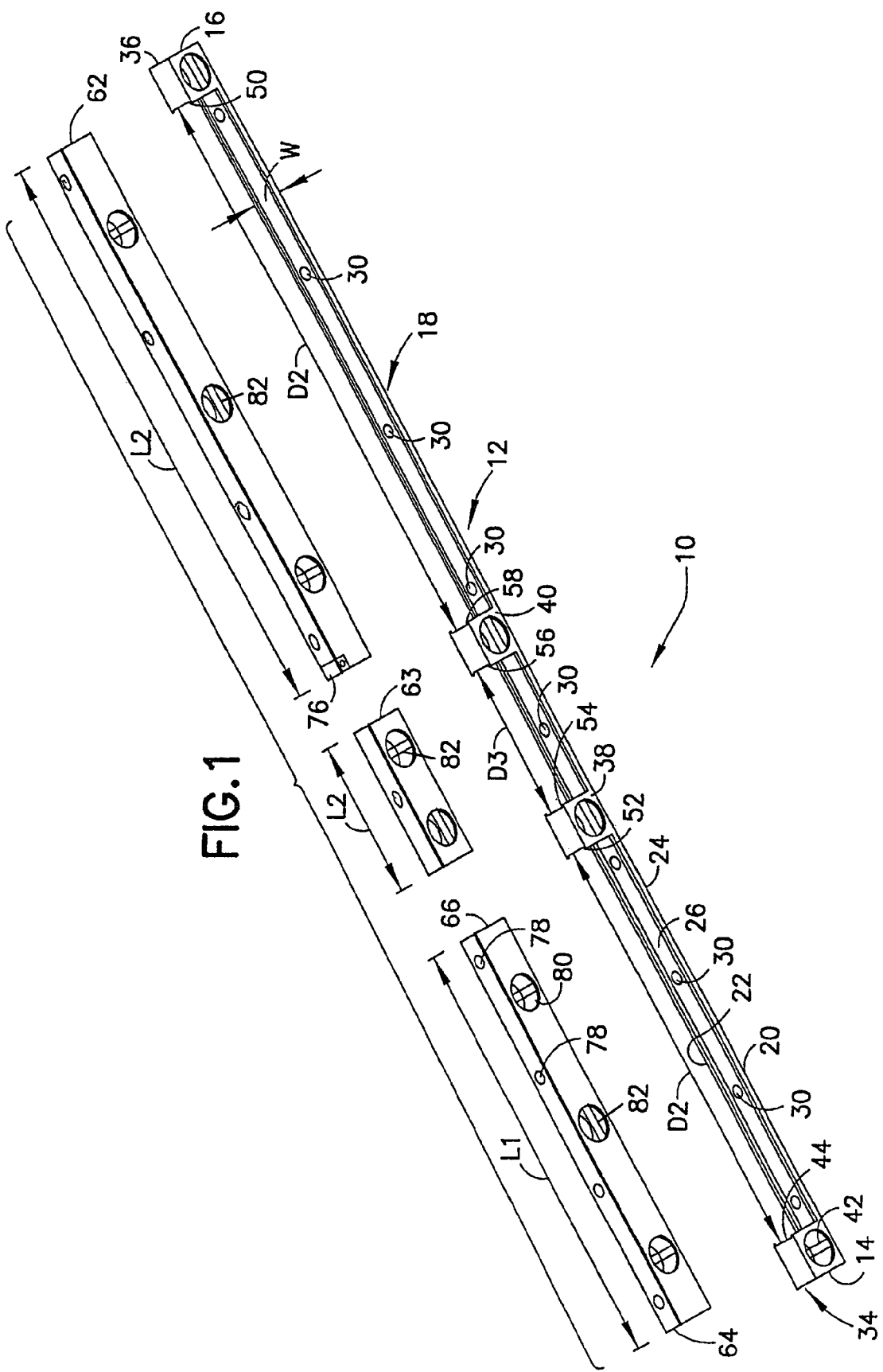
FIG. 1 is an exploded perspective few of a level assembly in accordance with the invention.

A level assembly in accordance with the subject invention is identified generally by the numeral 10 in FIG. 1. The level assembly 10 includes an elongate main level 12 with opposite first and second ends 14 and 16. The main level 12 includes a base wall 18 that extends continuously from the first end 14 to the second end 16 of the main level 12. The base wall 18 includes opposite substantially linear side edges 20 and 22, a bottom surface 24 and an opposite top surface 26. The side edges 20 and 22 define a width "w" for the base wall 18. The bottom surface 24 is substantially planar and continues from the first end 14 of the main level 12 to the second end 16 thereof. The top surface 26 in the preferred embodiment is recessed slightly between the side edges 20 and 22 to define a shallow groove extending along the length of the base wall 18. However, the top surface 26 of the base wall 18 can be substantially planar without the recess shown in the preferred embodiments of FIG. 1. Disc-shaped magnets 30 are imbedded in the top surface 26 of the base wall 18 in the preferred embodiment. However, certain embodiments may include ferrous metal inserts in place of the magnetic discs 30.

The main level 12 includes a first end vial support 34 substantially at the first end 14 of the main level 12, a second end vial support 36 substantially at the second end 16 of the main level 12 and first and second intermediate vial supports 38 and 40 between the first and second end vial supports 34 an 36. All of the vials supports 34-40 project up from the top surface 26 of the base wall 18, and all are very similar or substantially identical. More particularly, each vial support 34-40 is substantially rectangular and defines a width "w" substantially equal to the width of the base wall 18 of the main level 12.

The first end vial support 34 includes a generally cylindrical vial mounting aperture 42 extending transversally therethrough and generated about an axis aligned substantially parallel to the bottom surface 24 of the base wall 18 and substantially perpendicular to the longitudinal direction of the main level 12.

The first end vial support 34 includes a slightly recessed surface 44 facing towards the second end 16 of the main level 12. The recessed surface 44 extends substantially perpendicularly and continuously from the recessed top surface 26 of the base wall 18. A substantially cylindrical mounting ring 46 is mounted in the mounting aperture 42 and is oriented so that the central axis of the cylindrical mounting ring 46 is aligned substantially perpendicular to the longitudinal direction of the main level 12 and substantially parallel to the bottom surface 24 of the base wall 18 on the main level 12. A bubble level tube 48 extends diametrically across a mounting ring 46 and is filled partly with a liquid spirit sufficiently to define a bubble in the tube 48. The tube 48 is formed with markings "m" spaced substantially equally from the center of the mounting ring 46 so that the distance between the markings "m" corresponds to the length of the bubble in the tube 48. The axis of the bubble level tube 48 can be aligned substantially parallel to the longitudinal direction of the main level 18 or substantially perpendicular to the longitudinal direction of the main level 18. Additionally, in certain embodiments, the mounting ring 46 can be mounted for rotation in the mounting aperture 42 so that the longitudinal axis of the bubble tube 48 can be varied relative to the longitudinal direction of the main level 12.

The second end vial support 36 is substantially identical to the first end vial support 34. However, the second end vial support has recessed surface 50 that faces generally towards the first end 14 of the main level 12.

The first and second intermediate vial supports 38 and 40 are structurally very similar to the first end vial support 34 and the second end vial support 36. However, the first intermediate vial support 38 has first and second opposite recessed surfaces 52 and 54 facing towards the respective ends 14 and 16 of the main level 12. Similarly, the second intermediate vial support 40 has first and second recessed surfaces 56 and 58 facing towards the respective first and second ends 14 and 16 of the main level 12.

All four vial supports have bubble level tubes 48 therein similar to the bubble level tube 48 described with respect to the first end vial support 34. At least one of the bubble level tubes preferably is aligned or is alignable parallel to the longitudinal direction of the main level 12. At least one of the bubble level tubes is aligned or alignable substantially perpendicular to the longitudinal direction of the main level 12. Furthermore, one or more of the bubble level tubes can be rotatable into different angular alignments relative to the longitudinal direction of the main level 12 as mentioned above.

The first intermediate vial support 38 is spaced from the first end vial support 34 by a distance D1 as shown in FIG. 1. The second intermediate vial support 40 is spaced from the second end vial support 36 by a distance D2. The first and second intermediate vial supports 38 and 40 are spaced from one another by a distance D3. The respective distances D1, D2 and D3 all are different from one another. For example, the distance D1 may be approximately eighteen inches, the distance D2 may be approximately twenty-four inches while the distance D3 may be approximately nine inches.

The level assembly 10 further includes first, second and third auxiliary levels 61, 62 and 63. The first auxiliary level 61 is an elongate generally rectangular structure with first and second longitudinal ends 64 and 66, front and rear faces 68 and 70 extending substantially parallel to one another between the ends 64 and 66 and opposite longitudinal support faces 72 and 74. The first auxiliary level 61 has a length L1 substantially equal to or slightly less than the distance D1 between the first end vial support 34 and the first intermediate vial support 36. Additionally, the distance between the front and rear faces 68 and 70 of the first auxiliary 61 substantially equal the width of the recess in the top surface 26 of the base wall 18 and the width of the recessed surfaces 44 and 52 of the first end vial support 34 and the first intermediate vial support 38. As a result, the first auxiliary level 61 can nest on the top surface 26 of the base wall 18 between the first end vial support 34 and the first intermediate vial support 38 with one of the longitudinal support surfaces 72 or 74 substantially flush with top surfaces of the vial supports 34 and 38, as shown in FIG. 2. The longitudinal support surfaces 72 and 74 of the first auxiliary level 61 are provided with magnetic regions 78 for secure attachment to the magnetic discs 30 on the base wall 18. In this regard, the magnetic regions 78 may include magnetic inserts in the first auxiliary level 61 or regions formed from a ferrous metal material that will attract to the magnetic discs 30. Alternatively, the longitudinal supports surfaces 72 and 74 can be formed entirely from a ferrous metal or the entire body of the first auxiliary level 61 can be formed from a ferrous metal. In still other embodiments, magnetic discs can be provided on the longitudinal support surfaces 72 and 74 of the first auxiliary level 61 for releasable attachment to ferrous metal regions on the base wall 18. In preferred embodiments, the magnetic regions 78 are provided on both longitudinal support surfaces 72 and 74 and at positions symmetrically disposed relative to the first and second ends 64 and 66 of the first auxiliary level 61. As a result, either of the longitudinal support surfaces 72 and 74 can be releasably attached to the base wall 18 between the first end vial support 34 and the first intermediate support 38. Additionally, the first auxiliary level 61 can be releasably secured to the base wall 18 between the first end vial support 34 and the first intermediate support 38 in either of the optional end-to-end orientations. Thus, the first end 64 of the first auxiliary level can be adjacent either the first end vial support 34 or the first intermediate vial support 38.

Figure 4:
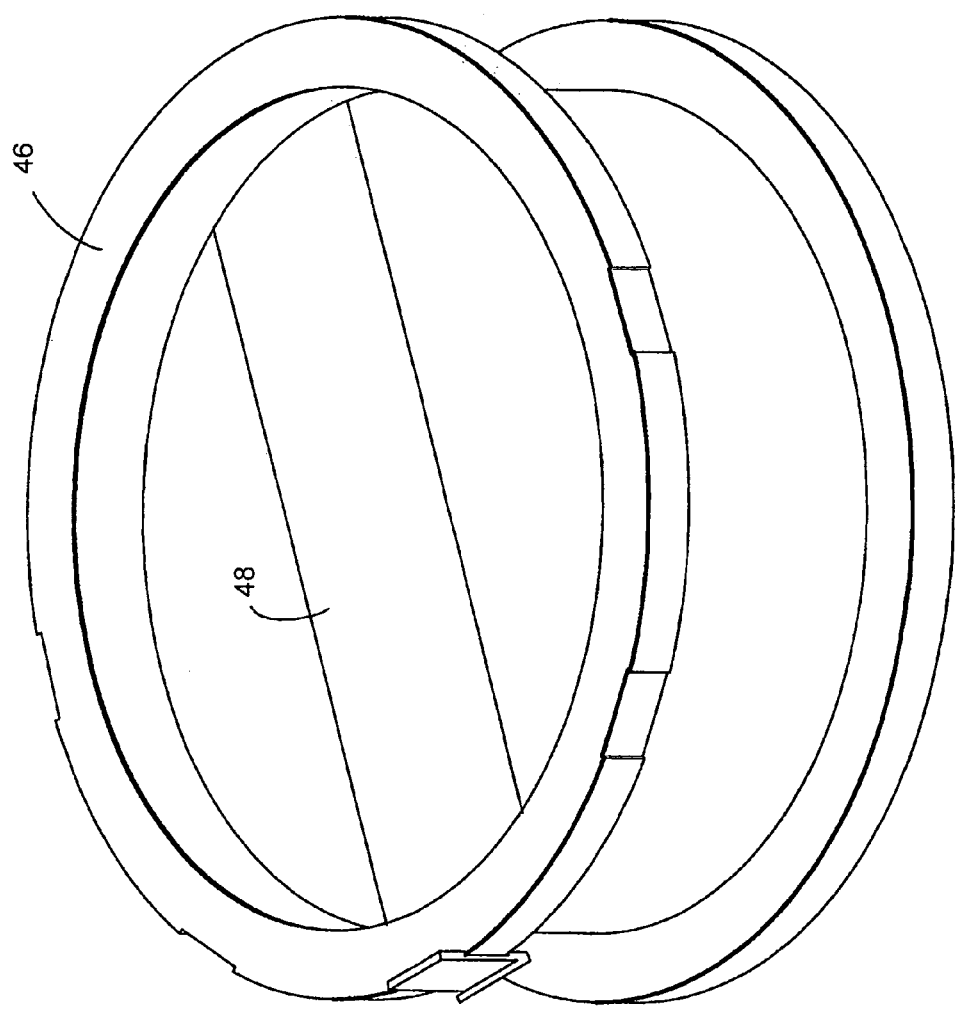
FIG. 4 is a perspective view of a rotatable vial assembly that can be used in the auxiliary level.
Figure 5:
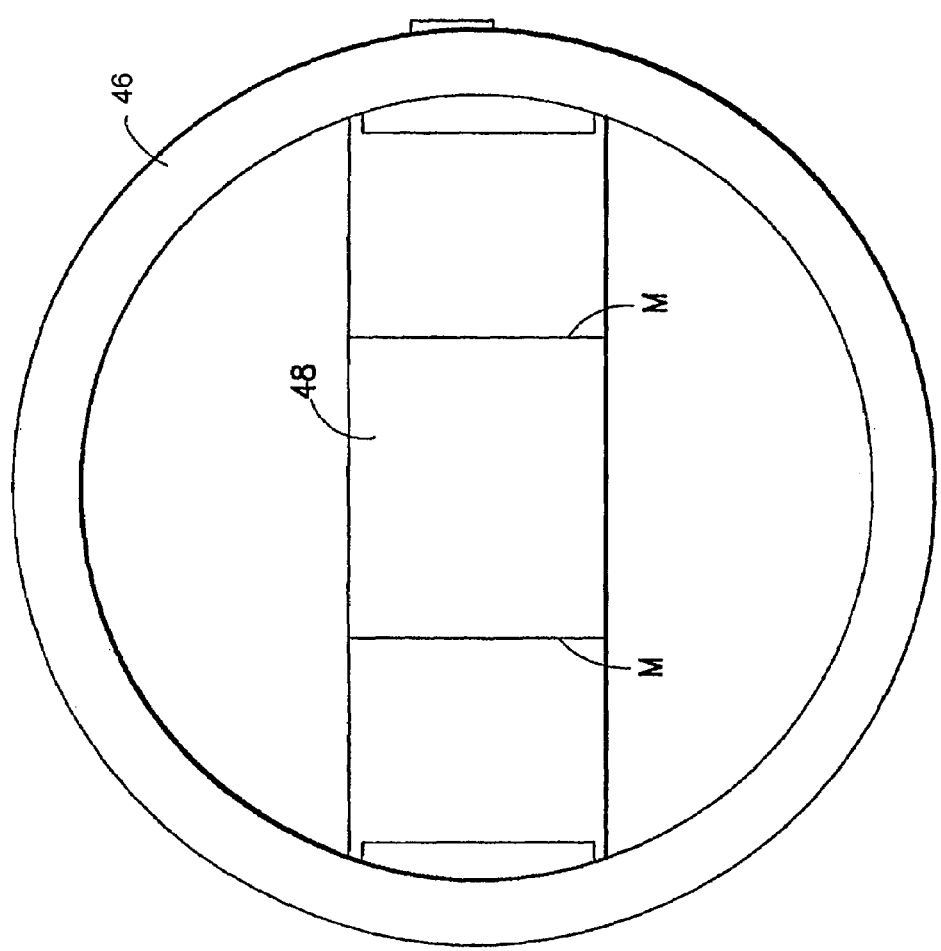
FIG. 5 is a front elevational view of the rotatable vial assembly shown in FIG. 4.

The first auxiliary level further includes a plurality of cylindrical apertures 80 extending entirely therethough from the front face 68 to the rear face 70. Bubble tubes 82 are mounted in the apertures 80. At least one bubble tube 82 has its axis extending parallel to the longitudinal direction of the first auxiliary level 61 and at least one bubble tube 82 has its longitudinal axis perpendicular to the longitudinal direction of the first auxiliary level 61. Furthermore, one or more of the bubble tubes can be mounted for rotation in the manner described above and illustrated in FIG. 4.

The second auxiliary level 62 is structurally similar to first auxiliary level 61, but defines a length L2 substantially corresponding to the distance D2 between the second end vial support 36 and the second intermediate vial support 40.

Thus, the second auxiliary level 62 can be secured releasably on the base wall 18 between the second end vial support 38 and the second intermediate vial support 40.

The third auxiliary level 63 is structurally similar to the first and second auxiliary levels 61 and 62. However, the third auxiliary level 63 defines a length L3 substantially corresponding to the distance D3 between the first and second intermediate vial supports 38 and 40. Additionally, the third auxiliary level 63 of the preferred embodiment has a length appropriate for only two bubble tubes 82 and hence has only two cylindrical apertures 80 for receiving bubble tubes 82.

Carpenter's levels often are use with pencils to mark a level line on a surface. A sharp pencil point helps to define a clear level line. However, a sharp pencil point is broken easily. Accordingly, one or more of the auxiliary levels 61-63 preferably have a pencil sharpener 76 mounted therein. In this embodiment, the pencil and sharpener is illustrated as being incorporated into the second auxiliary level 62. However, the pencil sharpener 76 may be disposed on a different auxiliary level 61 or 63 or on each of the auxiliary levels 61-63.

The level assembly 10 can be stored and transported with all three auxiliary levels 61-63 releasably secured on the based wall 18 of the main level 12. The level assembly 10 can be used in a conventional manner for spanning objects and surfaces that are spaced apart by a considerable distance. Additionally, the level assembly 10 can be used to mark a straight line across a relatively large object, such as a four by eight foot sheet of gypsum board. Often, however, the level assembly 10 will be too large or too unwieldy for a particular need. In these situations, an auxiliary level 61-63 of appropriate dimensions can be removed from the main level 12 for use in a conventional manner. After use, the selected or auxiliary levels 61-63 can be replaced on the top surface 26 of the main level 12. The magnet 30 and complementary magnetic regions 78 assure a sufficiently secure retention of the auxiliary levels 61-63 with the base wall 18 of the main level 12. Additionally, the selected auxiliary level 61-63 can be mounted so that either of its opposite longitudinal support surfaces can be mounted on the base wall 18 and the auxiliary levels 61-63 can be placed on the main level 12 in either of the two optional end-to-end orientations. Furthermore, the main level 12 is operative and functional even though one or more of the auxiliary levels 61-63 may be removed therefrom. In this regard, the recessed top surface 26 of the base wall 18 effectively defines opposed longitudinal reinforcing flanges at the sides 20 and 22 of the base wall 18 to prevent any significant deflection of the base wall 18 that could affect alignment assessments.

While the invention has been described with respect to certain preferred embodiment, various changes can be made with out departing from the scope of the invention as defined by the pending claims. For example, the illustrated embodiment of the level assembly 10 includes three auxiliary levels 61-63. However, embodiments with two auxiliary levels also are very useful. More than three auxiliary levels can be provided, but generally would not be of particular use.

Magnetic attachment means are described and illustrated for attaching the auxiliary levels 61-63 to the main level 12. Other attachments means can be provided such as spring clips or frictional retention.

The main level 12 and the auxiliary levels 61-63 are illustrated as having rotatable bubble tubes. However, fixedly mounted bubble tubes are less expensive and are suitable for most uses. Additionally, a fixed and calibrated bubble tube is likely to provide greater procession at lower cost.

The auxiliary levels 61-63 are illustrated as being cross-sectional smaller than the vial supports and narrower than the base wall 18. However, the auxiliary levels 61-63 may have a front surface 68 to rear surface 70 thickness substantially equal to the width "w" of the base wall 18.

The top surface 26 of the base wall 18 is illustrated as being recessed. However, the top surface 26 of the base wall 18 can be planar. Reinforcing ribs may extend down from the bottom surface 24 of the base wall 18 to provide sufficient rigidity for the base wall 18.

A preferred embodiment is illustrated as including a pencil sharpener. Other accessories can be provided in addition to or instead of the pencil sharpener. For example, one of more of the auxiliary levels 61-63 can be provided with a recess for releasably engaging a pencil. Furthermore, distance markings and indicia can be provided along the main level 12 and/or any of the auxiliary levels 61-63.

The main level is illustrated as including a plurality of bubble tubes mounted in the vial supports. However, the bubble tubes can be provided only in the auxiliary levels. The supports 34-40, therefore, would be provided only for positioning the auxiliary levels 61-63 on the base wall 18.

The auxiliary levels 61-63 are depicted as being substantially solid between the respective ends. However, one or more of the auxiliary levels 61-63 may have hollow regions to reduce weight and material costs and to facilitate holding the level 61-63 in position.

What is claimed is:

1. A level assembly comprising:

a main level having opposite first and second ends, a base wall extending between the ends, the base wall having opposite top and bottom surfaces, a first end support extending up from the top surface of the base wall at the first end and a second end support extending up from the top surface of the base wall at the second end, at least one intermediate support extending up from the top surface of the base wall and disposed at a first distance from the first end support and at a second distance from the second end support, the first and second distances being different from one another, a first upwardly open receptacle defined adjacent the top surface of the base wall and between the first end support and the intermediate support, a second upwardly open receptacle defined adjacent the top surface of the base wall and between the second end support and the intermediate support;

a first auxiliary level releasably mounted to the first receptacle of the main level and extending from the first end support to the intermediate support the first auxiliary level being movable upwardly from the base wall for use independent of the main level; and a second auxiliary level releasably mounted to the second receptacle of the main level and extending from the second end support to the intermediate support the second auxiliary level being movable upwardly from the base wall for use independently of the main level.

2. The level assembly of claim 1, wherein the at least one intermediate support comprises first and second spaced apart intermediate supports, the first and second intermediate supports being spaced from one another by a third distance that is different than the first and second distances, the first receptacle extending from the first end support to the first intermediate support, the second receptacle extending from the second end support to the second intermediate support, a third auxiliary level receptacle defined adjacent the top surface of the base wall and extending between the first and second intermediate supports, the level assembly further comprising a third auxiliary level releasably mounted to the third receptacle of the main level and extending between the first and second intermediate supports, the third auxiliary level being movable up from the base wall for use independent of the main level.

3. The level assembly of claim 1, further comprising magnets for releasably securing the auxiliary levels to the main level.

4. The level assembly of claim 3, wherein the magnets are disposed for permitting releasable attachment of the auxiliary levels to the main level in either of two end-to-end orientations.

5. The level assembly of claim 1, wherein at least one of the supports of the main level has a bubble tube disposed therein.

6. The level assembly of claim 1, wherein the top surface of the base wall of the main level includes a longitudinally extending recess dimensioned for nesting with the auxiliary levels.

7. The level assembly of claim 1, wherein the base wall of the main level includes a plurality of longitudinal extending reinforcing ribs for substantially preventing deflection of the base wall.

8. The level assembly of claim 1, further comprising a pencil sharpener mounted in at least one of the main level and the auxiliary levels.

9. The level assembly of claim 1, wherein the first end support has a recess facing towards the second end of the level, the second end support has a recess facing towards the first end of the level, and the at least one intermediate support has recesses facing respectively towards the first and second ends of the level, the recesses in the first and second end supports and the at least one intermediate support extending substantially continuously up from the top surface of the base wall being dimensioned to slidably receive end portions of the respective auxiliary levels.

10. The level assembly of claim 1, wherein each of the first and second end supports and the intermediate support has a bubble tube disposed therein.

11. The level assembly of claim 1, wherein the auxiliary levels have substantially identical rectangular cross-sectional shapes.

12. The level assembly of claim 1, wherein each of said auxiliary levels has at least two bubble tubes.

13. A level assembly comprising:
a main level having opposite first and second ends, a base wall extending between the first and second ends, the base wall having top and bottom surfaces, a first end support extending up from the top surface of the base wall at the first end and having a groove extending up from the base wall along a surface of the first end support facing the second end of the main level, a second end support extending up from the top surface of the base wall at the second end and having a groove extending up from the base wall along a surface of the second end support facing the first end of the main level, an intermediate support extending up from the top surface of the base wall and spaced unequal distances from the first and second end supports, the intermediate support having first and second grooves facing respectively towards the first and second end supports, a first upwardly open receptacle defined adjacent the top surface of the base wall and between the first end support and the intermediate support, a second upwardly open receptacle defined adjacent the top surface of the base wall and between the second end support and the intermediate support, the first and second end supports and the intermediate support each having at least one bubble tube disposed therein;

a first auxiliary level releasably mounted to the first receptacle of the main level and having opposite ends slidably nested in the groove of the first end support and the first groove of the intermediate support, the first auxiliary level being movable up from the base wall for use independent of the main level; and a second auxiliary level releasably mounted to the second receptacle of the main level and having opposite ends slidably nested in the groove of the second end support and the second groove of the intermediate support, the second auxiliary level being movable up from the base wall for use independent of the main level.

14. The level assembly of claim 13, further comprising magnets for releasably securing the auxiliary levels to the main level.

15. The level assembly of claim 14, wherein the magnets are disposed for permitting releasable attachment of the auxiliary levels to the main level in either of two end-to-end orientations.

16. The level assembly of claim 13, wherein the top surface of the base wall has at least one groove for nesting with side edges of the auxiliary levels.

17. The level assembly of claim 13, wherein the auxiliary levels have substantially identical rectangular cross-sectional shapes.

18. The level assembly of claim 13, wherein each of said auxiliary levels has at least two bubble tubes.

\* \* \* \* \*